(12) United States Patent
Wang

(10) Patent No.: US 11,589,210 B2
(45) Date of Patent: Feb. 21, 2023

(54) INFORMATION PROCESSING METHOD AND APPARATUS, AND COMPUTER STORAGE MEDIUM

(71) Applicant: China Academy of Telecommunications Technology, Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 29 days.

(21) Appl. No.: 16/963,227

(22) PCT Filed: Dec. 14, 2018

(86) PCT No.: PCT/CN2018/121319
§ 371 (c)(1),
(2) Date: Jul. 19, 2020

(87) PCT Pub. No.: WO2019/141032
PCT Pub. Date: Jul. 25, 2019

(65) Prior Publication Data
US 2021/0377720 A1 Dec. 2, 2021

(30) Foreign Application Priority Data
Jan. 19, 2018 (CN) .......................... 201810053378.6

(51) Int. Cl.
*H04W 8/08* (2009.01)
*H04W 60/02* (2009.01)
*H04W 60/04* (2009.01)

(52) U.S. Cl.
CPC ............. *H04W 8/08* (2013.01); *H04W 60/02* (2013.01); *H04W 60/04* (2013.01)

(58) Field of Classification Search
CPC ........ H04W 8/08; H04W 60/02; H04W 60/04
See application file for complete search history.

(56) References Cited

U.S. PATENT DOCUMENTS

2018/0262924 A1* 9/2018 Dao .................. H04W 72/1257

FOREIGN PATENT DOCUMENTS

| CN | 104365143 A | 2/2015 |
|---|---|---|
| CN | 104838708 A | 8/2015 |

(Continued)

OTHER PUBLICATIONS

Nokia et al., "TS 23.503: Reference architecture of policy framework", SA WG2 Meeting #123, Oct. 23-27, 2017, Ljubljana, Slovenia, total 4 pages, S2-177738.

(Continued)

*Primary Examiner* — Mazda Sabouri
(74) *Attorney, Agent, or Firm* — Kilpatrick Townsend & Stockton, LLP

(57) ABSTRACT

Disclosed are an information processing method and apparatus, and a computer storage medium, and same are used for setting, based on mobility-related information of a terminal, mobility management parameters of the terminal, so that registration area management and accessibility management can be carried out using a mobility behavior analysis result of the terminal. The information processing method provided in the present application comprises: an AMF receiving mobility-related information of a terminal, and the mobility-related information of the terminal is mobility analysis/prediction information, sent by an NWDAF, of the terminal or mobility management policy information, sent by a PCF, of the terminal; and the AMF setting, according to the mobility-related information of the terminal, mobility management parameters of the terminal.

17 Claims, 7 Drawing Sheets

(56) References Cited

FOREIGN PATENT DOCUMENTS

| | | |
|---|---|---|
| CN | 107079279 A | 8/2017 |
| CN | 107087255 A | 8/2017 |
| WO | 2017193970 A1 | 11/2017 |
| WO | 2017211289 A1 | 12/2017 |

OTHER PUBLICATIONS

3GPP TS 23.502 V15.0.0; 3rd Generation Partnership Project; Technical Specification Group Services and System Aspects;Procedures for the 5G System;Stage 2 (Release 15); total 9 pages, Dec. 2017.
3GPP TS 23.501 V15.0.0, 3rd Generation Partnership Project;Technical Specification Group Services and System Aspects;System Architecture for the 5G System; Stage 2; Release 15, total 181 pages, Dec. 2017.
3GPP TS 23.503 V15.0.0, 3rd Generation Partnership Project;Technical Specification Group Services and System Aspects:Policy and Charging Control Framework for the 5G System; Stage 2, Release 15, total 56 pages, Dec. 2017.
Samsung,"Which network function takes responsible for mobility pattern", SA WG2 Meeting #118-BIS, Jan. 16-20, 2017 Spokane, WA, USA, total 4 pages, S2-170255.
Huawei et al.,"TS 23.501: Procedures between PCF and AMF", SA WG2 Meeting #120, Mar. 27-31, 2017, Busan, South Korea, total 5 pages, S2-172509 (revision of S2-172500 of S2-171869).

* cited by examiner ies according to the UE mobility-related information.
INFORMATION PROCESSING METHOD AND APPARATUS, AND COMPUTER STORAGE MEDIUM The present application is a National Stage of International Application No. PCT/CN2018/121319 filed on Dec. 14, 2018, which claims the priority from Chinese Patent Application No. 201810053378.6, filed with the Chinese Patent Office on Jan. 19, 2018 and entitled "Information Processing Method and Apparatus, and Computer Storage Medium", both of which are hereby incorporated by reference in its entirety their entireties.

FIELD OF DISCLOSURE

The present application relates to the field of communication technologies, and particularly to an information processing method and apparatus, and a computer storage medium.

BACKGROUND

In the communication technology of the fifth-generation (5G) phase 1, the Network Data Analysis (NWDA) function is introduced, where this function can analyze the network data and then provide the analysis result, so that the 5G network can perform the network optimization.

However, neither how the 5G network obtains the mobility behavior analysis of the terminal nor how the 5G network use the result of the mobility behavior analysis of the terminal to perform the registration area management and reachability management is given in the prior art.

BRIEF SUMMARY

The embodiments of the present application provide an information processing method and apparatus, and a computer storage medium, to implement the setting for the UE mobility management parameters based on the UE mobility-related information, so that the registration area management and reachability management can be performed by using the mobility behavior analysis result of the terminal.

An information processing method provided by an embodiment of the present application includes:
receiving, by an AMF, UE mobility-related information, and the UE mobility-related information is UE mobility analytics/prediction information sent by an NWDAF or UE mobility management policy information sent by a PCF;
setting, by the AMF, UE mobility management parameters according to the UE mobility-related information.

With this method, the AMF receives the UE mobility-related information, and the UE mobility-related information is the UE mobility analytics/prediction information sent by the NWDAF or the UE mobility management policy information sent by the PCF, so that the AMF sets the UE mobility management parameters according to the UE mobility-related information, to implement the registration area management and reachability management by using the mobility behavior analysis result of the terminal.

In one embodiment, the UE mobility management policy information includes:
UE mobility management parameters, and a condition of using the UE mobility management parameters.

In one embodiment, the UE mobility management parameters include:
registration area information; and/or
a periodic registration timer value.

In one embodiment, the condition includes at least one of:
identity information of the terminal;
location or area information of the terminal;
date or time information.

In one embodiment, the setting, by the AMF, UE mobility management parameters according to the UE mobility-related information, includes:
determining, by the AMF, the UE mobility management parameters according to a condition in which the terminal is and the UE mobility analytics/prediction information; or
determining, by the AMF, the UE mobility management parameters when determining that a condition in which the terminal is satisfies a condition of using the UE mobility management parameters contained in the UE mobility management policy information.

In one embodiment, the setting, by the AMF, UE mobility management parameters according to the UE mobility-related information, includes:
allocating a registration area for the terminal and notifying the terminal of the registration area; and/or
allocating a periodic registration timer value for the terminal and notifying the terminal of the periodic registration timer value.

Correspondingly, at the PCF side, an information processing method provided by an embodiment of the present application includes:
determining, by a PCF, UE mobility management policy information;
sending, by the PCF, the UE mobility management policy information to an AMF.

In one embodiment, the determining, by a PCF, UE mobility management policy information, includes:
receiving, by the PCF, UE mobility analytics/prediction information sent by an NWDAF, and generating, by the PCF, the UE mobility management policy information according to the UE mobility analytics/prediction information;
or receiving, by the PCF, the UE mobility management policy information sent by the NWDAF.

In one embodiment, the UE mobility management policy information includes:
registration area information and a condition of using the registration area information; and/or
a periodic registration timer value and a condition of using the periodic registration timer value.

An information processing apparatus provided by an embodiment of the present application includes:
a memory configured to store program instructions;
a processor configured to invoke the program instructions to perform following processes of:
   receiving UE mobility-related information via a transceiver, and the UE mobility-related information is UE mobility analytics/prediction information sent by an NWDAF or UE mobility management policy information sent by a PCF;
   setting UE mobility management parameters according to the UE mobility-related information.

In one embodiment, the UE mobility management policy information includes:
UE mobility management parameters, and a condition of using the UE mobility management parameters.

In one embodiment, the UE mobility management parameters include:
registration area information; and/or
a periodic registration timer value.

In one embodiment, the condition includes at least one of:
identity information of the terminal;
location or area information of the terminal;

date or time information.

In one embodiment, the processor sets the UE mobility management parameters according to the UE mobility-related information, by:

determining the UE mobility management parameters according to a condition in which the terminal is and the UE mobility analytics/prediction information; or determining the UE mobility management parameters when determining that a condition in which the terminal is satisfies a condition of using the UE mobility management parameters contained in the UE mobility management policy information.

In one embodiment, the processor sets the UE mobility management parameters according to the UE mobility-related information, by:

allocating a registration area for the terminal and notifying the terminal of the registration area via the transceiver; and/or allocating a periodic registration timer value for the terminal and notifying the terminal of the periodic registration via the transceiver.

A second information processing apparatus provided by an embodiment of the present application includes:

a memory configured to store program instructions;

a processor configured to invoke the program instructions to perform following processes of:

determining UE mobility management policy information;

sending the UE mobility management policy information to an AMF via a transceiver.

In one embodiment, the determining UE mobility management policy information, includes:

receiving UE mobility analytics/prediction information sent by an NWDAF via the transceiver, and generating the UE mobility management policy information according to the UE mobility analytics/prediction information;

or receiving the UE mobility management policy information sent by the NWDAF via the transceiver.

In one embodiment, the UE mobility management policy information includes:

registration area information and a condition thereof; and/or a periodic registration timer value and a condition thereof.

A third information processing apparatus provided by an embodiment of the present application includes:

a receiving device configured to receive UE mobility-related information, and the UE mobility-related information is UE mobility analytics/prediction information sent by an NWDAF or UE mobility management policy information sent by a PCF;

a setting device configured to set UE mobility management parameters according to the UE mobility-related information.

A fourth information processing apparatus provided by an embodiment of the present application includes:

a determining device configured to determine UE mobility management policy information;

a sending device configured to send the UE mobility management policy information to an AMF.

Another embodiment of the present application provides a computer storage medium storing the computer executable instructions which are configured to cause a computer to perform any one of the above-mentioned methods.

BRIEF DESCRIPTION OF THE DRAWINGS

The embodiments of the present application are described more clearly in the accompanying figures which need to be used in describing the embodiments will be introduced below briefly.

DETAILED DESCRIPTION OF THE EMBODIMENTS

Figure 1:
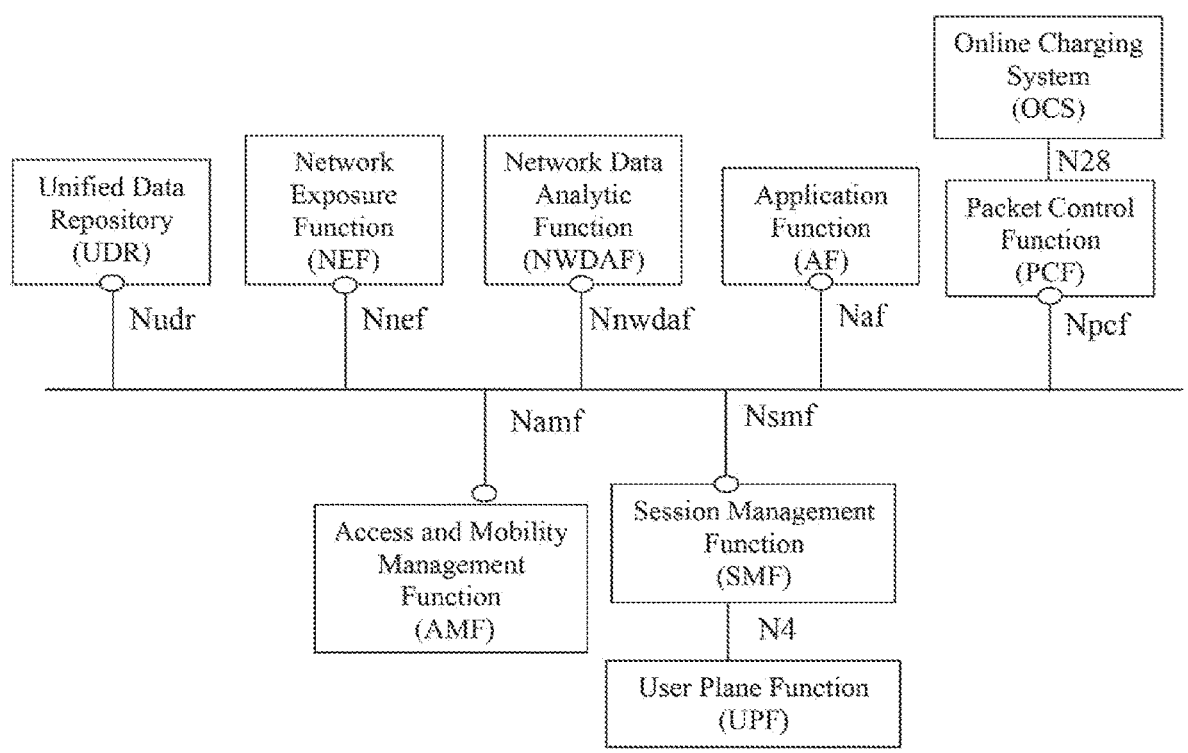
FIG. 1 is a schematic diagram of a 5G network architecture supporting the NWDA provided by an embodiment of the present application.

The described embodiments are a part of the embodiments of the disclosure but not all the embodiments.

One embodiment, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the disclosure. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the disclosure, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be a Base Transceiver Station (BTS) in the GSM or CDMA, or may be a NodeB in the TD-SCDMA or WCDMA, or may be an evolutional Node B (eNodeB or eNB or e-NodeB) in the LTE, or may be a gNB in the 5G NR, which is not limited in the disclosure.

The embodiments of the present application provide an information processing method and apparatus, and a computer storage medium, to implement the setting for the UE mobility management parameters based on the UE mobility-related information, so that the registration area management and reachability management can be performed by using the mobility behavior analysis result of the terminal.

The fifth-generation (5G) network needs to support the on-demand mobility management, that is, provide the customized mobility management services for the mobile behavior characteristics of individual User Equipment (UE), including the registration area management for the individual UE and the reachability management of the UE, which requires that the 5G network can obtain the analysis of the UE's mobility behavior and then customize the mobility management mechanism. In 5G phase 1, the NWDA function is introduced in the 5G network, where this function can analyze the network data and then provide the analysis result to the 5G network, so that the 5G network can perform the network optimization. However, the current NWDA function is only used for the slice-related network data analysis, but does not analyze the UE mobility behavior. Therefore, the embodiments of the present application propose of performing the registration area management and reachability management of the UE based on the analysis result of the UE mobility behavior provided by the NWDA.

Firstly, the 5G Policy Control and Charging (PCC) network architecture that supports the NWDA is shown in FIG. 1. In this architecture, the Network Data Analytic Function (NWDAF) is a network analysis function managed by the operator, and the NWDAF provides the slice-related network data analysis to the Packet Control Function (PCF) and Network Slice Selection Function (NSSF). The provided network data analysis is at the network slice level, and the NWDAF does not need to perceive the users currently using slices. The NWDAF notifies or pushes the slice-related network state analysis information to the PCF and NSSF which subscribe for the data analysis. The PCF and NSSF may obtain it directly from the NWDAF.

Regarding the registration area management described in the embodiments of the present application:

the registration area management function mainly refers to the allocation and re-allocation of registration area for a User Equipment (UE). After the UE accesses and registers with the network through the 3rd Generation Partnership Project (3GPP), the AMF allocates a Tracking Area Identity (TAI) list to the UE, where the TAI list includes a set of Tracking Areas (TAs). The Access and Mobility management Function (AMF) entity needs to consider the mobility restriction information and mobility model information for the terminal when allocating the registration area. After the UE accesses the network through non-3GPP, the entire network uses a unique TA. At this time, the AMF may only include the unique TA in the TAI list.

Regarding the reachability management described in the embodiments of the present application:

after a UE enters the idle (CM-IDLE) state, the UE will start the timer according to the periodic registration timer value received in the registration process, where the timer value is determined by the AMF according to the UE subscription, local policy, etc. The UE will initiate the periodic registration update process after the periodic registration timer expires.

The AMF will run a mobile reachable timer. This timer starts running after the UE enters the CM IDLE state, and its value is slightly larger than the value of the periodic registration timer. During the running of the mobile reachable timer, if the UE enters the CONNECTED state, the AMF will stop the mobile reachable timer. If the mobile reachable timer expires, the AMF can determine that the UE is unreachable. Since the AMF does not know when the UE will be reachable, the AMF cannot immediately register the UE, but the AMF clears the PPF flag and starts the implicit de-registration timer by using a relatively larger value after the mobile reachable timer expires. When the UE state becomes the connected state, the AMF needs to stop the implicit de-registration timer and set the PPF flag.

The examples of two specific methods provided by the embodiments of the present application will be given below respectively.

First Method.

The PCF determines the Mobility Management policy (MM policy for short) information according to the UE mobility behavior information (also called mobility analysis/prediction information) (e.g., the UE mobility pattern, the historical location statistical information of the terminal, the mobile trajectory prediction information of the terminal, etc.) provided by the NWDAF, and the MM policy information may include the UE mobility management parameters, and may further include the condition of using the UE mobility management parameters. Here, the movement mode of the UE includes, for example, the movement speed and direction of the UE.

Here, the UE mobility management parameters for example include:

recommended registration area;

and/or recommended periodic registration timer value.

The condition includes, for example, at least one of:

identity information of the terminal;

location or area information of the terminal;

date and/or time information.

After determining the mobility management policy, the PCF provides the mobility management policy to the AMF.

The AMF may refer to the mobility management policy when allocating the registration area and periodic registration timer.

Two specific embodiments of the first method are given below.

First embodiment: performing the registration area management based on the MM policy.

Figure 2:
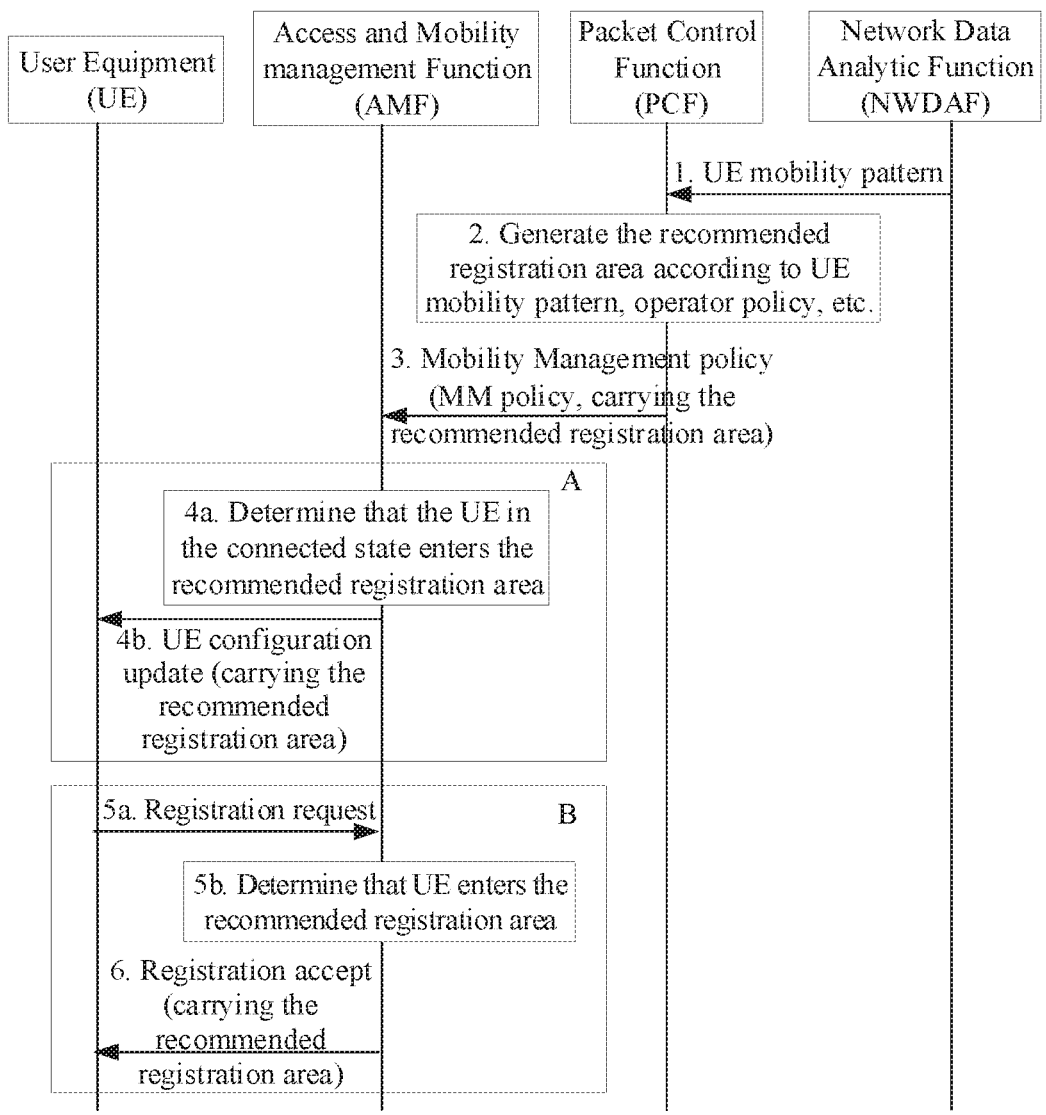
FIG. 2 is a schematic diagram of a specific process of an information processing method under the 5G network architecture provided by an embodiment of the present application.

Referring to FIG. 2, the specific processing flow includes following.

Step 1: the PCF receives the UE mobility-related information such as UE mobility pattern from the NWDAF.

Step 2: the PCF determines the registration area information of the UE in a specific area, i.e., the information of the recommended registration area of the UE, according to the UE mobility pattern, the locally configured operator policy of the PCF, etc., and the registration area includes the information of a set of TAs or a cell list. The specific area may be represented in the form of geographic area, so the PCF may need to map the geographic area to the TA or cell list, that is to say, convert the information of the geographic area of the UE into the information of the TA or cell list. The specific conversion method can adopt the existing technology, generating the recommended registration area for the UE.

Step 3: the PCF sends the MM policy to the AMF, which carries the generated recommended registration area and may further include the condition of using the recommended registration area, and the condition is, for example, the use time and location of the recommended registration area and other relevant constraints.

The following step A and step B are either- or steps.

Step A:

Step 4a: the AMF finds that the UE in the connected state enters the recommended registration area and meets the condition according to the MM policy after receiving the MM policy, and then performs step 4b;

Step 4b: the AMF configures the recommended registration area for the UE through the UE configuration update process.

Step B:

Step 5a: the AMF receives the registration request of the UE in the idle state;

Step 5b: the AMF determines that the MM policy satisfies its condition, for example, determines that the UE enters the recommended registration area in a suitable time period.

Step 6: the AMF assigns the recommended registration area as the registration area to the UE through the registration accept.

Second embodiment: performing the reachability management based on the MM policy.

Figure 3:
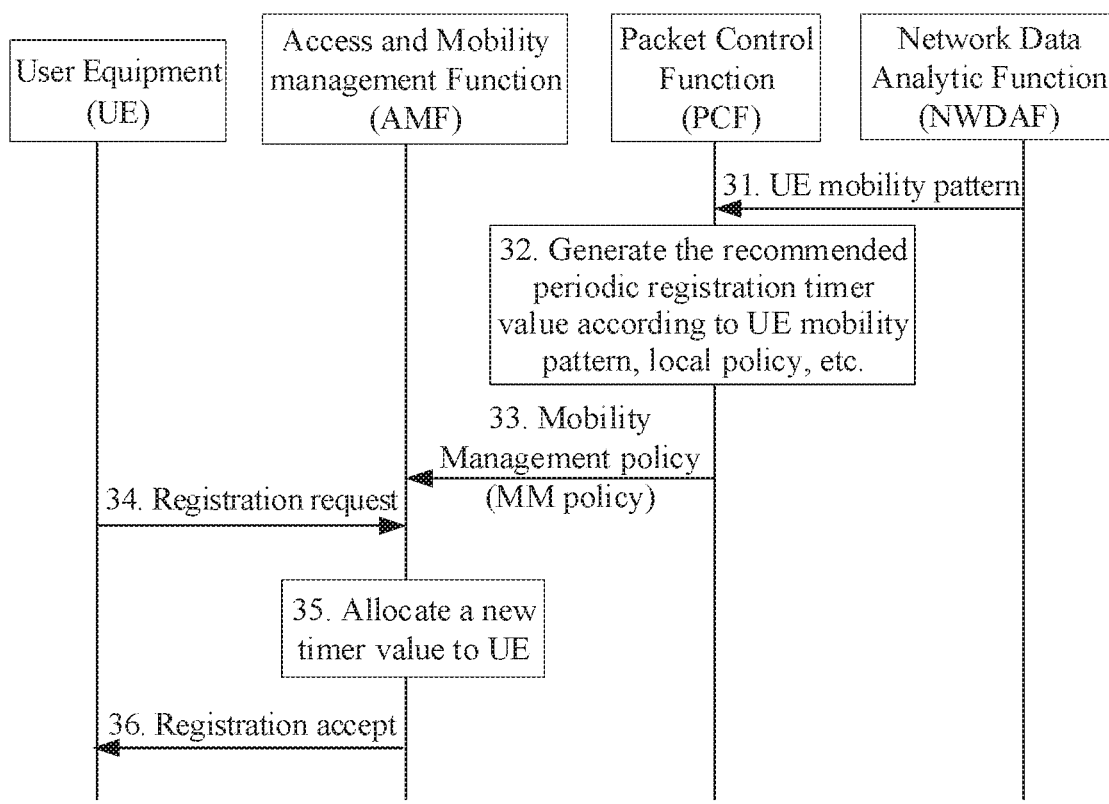
FIG. 3 is a schematic diagram of a specific process of another information processing method under the 5G network architecture provided by an embodiment of the present application.

Referring to FIG. 3, the specific processing flow includes:

Step 31: the PCF receives the mobility-related information of the UE such as UE mobility pattern from the NWDAF;

Step 32: the PCF determines the recommended periodic registration timer value used by the UE in a specific location area and/or a specific time period according to the UE mobility pattern, operator policy, etc., and then the PCF generates the MM policy containing the determined recommended periodic registration timer value and its condition, and the condition is, for example, time, location, etc.;

Step 33: the PCF sends the MM policy to the AMF, and the AMF receives and saves the MM policy;

Step 34: the AMF receives the registration request of the UE in the idle state;

Step 35: if the AMF finds according to the MM policy that the location or time point where/when the UE sends the registration request meets the condition of using the recommended periodic registration timer carried in the MM policy, the AMF determines a new periodic registration timer value for the UE, that is, updates the recommended periodic registration timer value carried in the MM policy to the UE;

Step 36: the AMF notifies the UE of the new periodic registration timer value (i.e., the periodic registration timer value determined in step 32) through a registration accept message.

In addition, there may be other steps (not shown in the figure). For example, the AMF may send the periodic registration timer value to the access network node after the UE enters the connected state, so that the access network node performs the reachability monitoring and management (the reachability monitoring and management is the existing technology) of the UE according to the new periodic registration timer value.

Second Method.

The AMF determines the Mobility Management policy (MM policy for short) information according to the mobility behavior information (which may be historical information or prediction information, and therefore, may also be called mobility analysis/prediction information) of the terminal, e.g., the mobility pattern of the UE, and the MM policy information may include the UE mobility management parameters, and may further include the condition of using the UE mobility management parameters.

Here, the UE mobility management parameters for example include:

recommended registration area;

and/or recommended periodic registration timer value.

The condition includes, for example, at least one of:

identity information of the terminal;

location or area information of the terminal;

date and/or time information.

The AMF allocates the corresponding recommended registration area or periodic registration timer to the UE when judging that the UE meets the condition of using the recommended registration area and recommended periodic registration timer value.

Third embodiment: performing the registration area management based on the output of the NWDAF.

Figure 4:
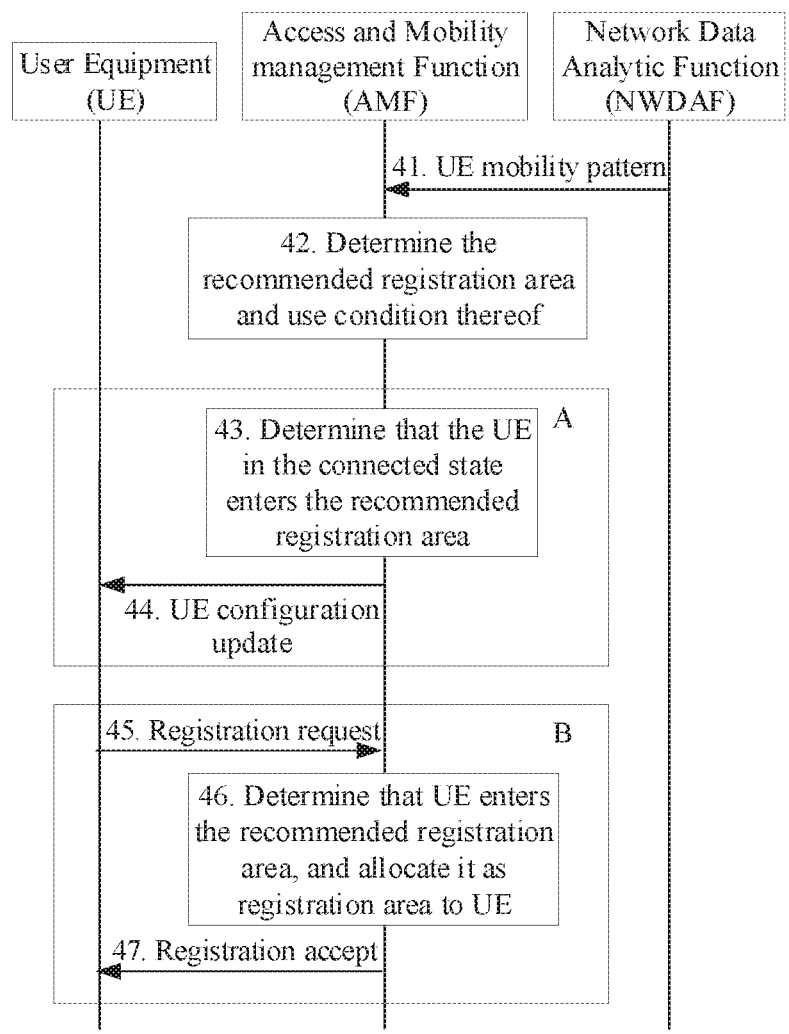
FIG. 4 is a schematic diagram of a specific process of a third information processing method under the 5G network architecture provided by an embodiment of the present application.

Referring to FIG. 4, the specific processing flow includes:

Step 41: the AMF receives the network data analysis result, including UE mobility pattern, etc., from the NWDAF;

Step 42: the AMF determines the recommended registration area information of the UE at a specific location and generates the recommended registration area and the condition of using the recommended registration area according to the UE mobility pattern, operator policy, etc., and the recommended registration area consists of a set of TAs or a cell list; and the specific location may be a geographic location.

The following step A and step B are either- or steps.

Step A:

Step 43: if the AMF finds that the UE in the connected state meets the condition of using the recommended registration area, it performs step 44;

Step 44: the AMF configures the recommended registration area for the UE through the UE configuration update process.

Step B:

Step 45: the AMF receives the registration request of the UE in the idle state;

Step 46: the AMF finds that the UE meets the condition of using the recommended registration area, and allocates the recommended registration area to the UE;

Step 47: the AMF notifies the UE of the recommended registration area as the registration area through a registration accept message.

Fourth embodiment: performing the reachability management based on the MM policy.

Figure 5:
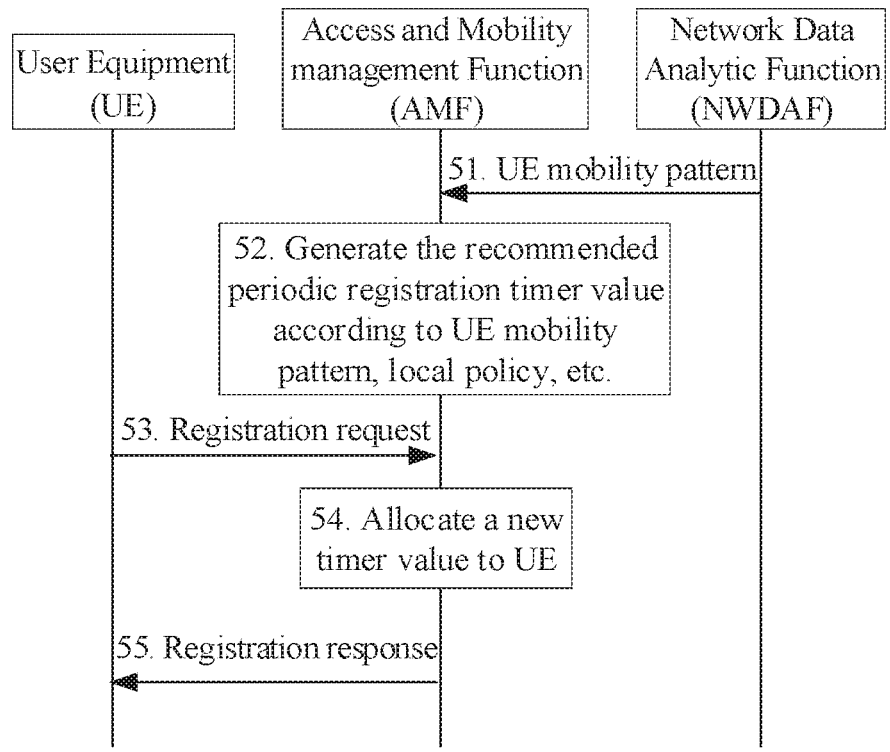
FIG. 5 is a schematic diagram of a specific process of a fourth information processing method under the 5G network architecture provided by an embodiment of the present application.

Referring to FIG. 5, the specific processing flow includes following.

Step 51: the AMF receives the UE mobility-related information such as UE mobility pattern from the NWDAF.

Step 52: the AMF determines the recommended periodic registration timer value used by the UE in a specific location area and/or a specific time period according to the UE mobility pattern, operator policy, etc., and generates the MM policy containing the recommended registration timer value and the condition of using this timer value; and the condition is, for example, time, location, etc. Both the specific area and the specific time period may be the information set in advance according to the actual demands.

Step 53: the AMF receives the registration request of the UE in the idle state.

Step 54: if the AMF finds according to the MM policy that the location or time point where/when the UE sends the registration request meets the condition of using a new periodic registration timer, the AMF determines a new periodic registration timer value (the periodic registration timer value determined in step 52) for the UE, that is, updates the recommended periodic registration timer value carried in the MM policy to the UE.

Step 55: the AMF notifies the UE of the new periodic registration timer value (i.e., the periodic registration timer value determined in step 52) through a registration accept message.

In addition, there may be other steps (not shown in the figure). For example, the AMF may send the periodic registration timer value to the access network node after the UE enters the connected state, so that the access network node performs the reachability monitoring and management (the reachability monitoring and management is the existing technology) of the UE according to the new periodic registration timer value.

Figure 6:
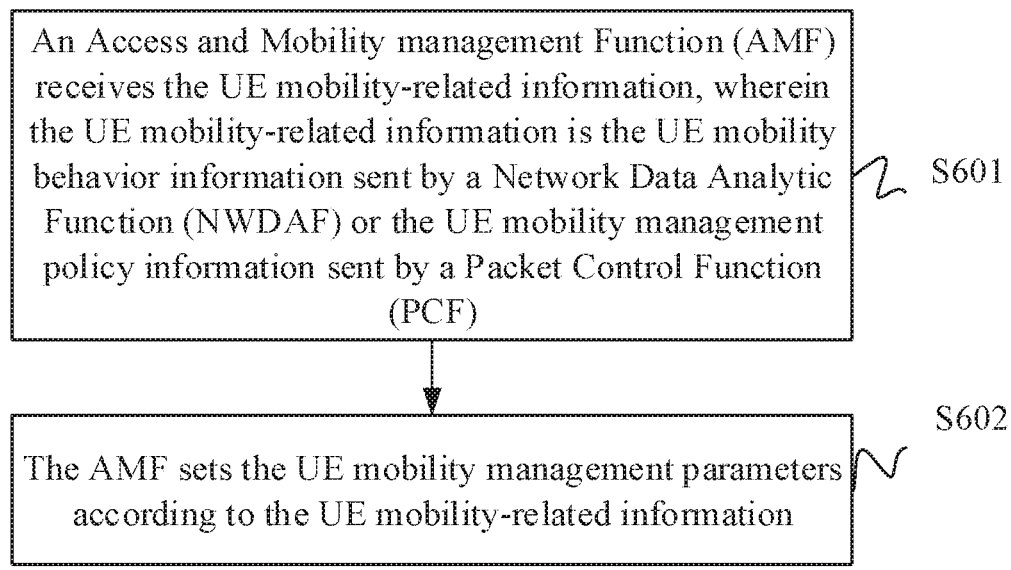
FIG. 6 is a schematic diagram of an overall process of an information processing method at the AMF side provided by an embodiment of the present application.

In summary, at the AMF side, referring to FIG. 6, an information processing method provided by an embodiment of the present application includes following.

S601: an AMF receives the UE mobility-related information, and the UE mobility-related information is the UE mobility behavior information sent by an NWDAF or the UE mobility management policy information sent by a PCF.

Here, the UE mobility behavior information sent by the NWDAF is, for example, the UE mobility-related information such as UE mobility pattern received by the AMF directly from the NWDAF in the description of the second method described above.

Here, the UE mobility management policy information sent by the PCF is, for example, the UE mobility management policy information received by the AMF directly from the PCF in the description of the first method described above.

S602: the AMF sets the UE mobility management parameters according to the UE mobility-related information.

With this method, the AMF receives the UE mobility-related information, and the UE mobility-related information is the UE mobility behavior information sent by the NWDAF or the UE mobility management policy information sent by the PCF, so that the AMF sets the UE mobility management parameters according to the UE mobility-related information, to implement the registration area management and reachability management by using the mobility behavior analysis result of the terminal.

In one embodiment, the UE mobility management policy information includes:

UE mobility management parameters, and the condition of using the UE mobility management parameters.

In one embodiment, the UE mobility management parameters include:

recommended registration area information; and/or
recommended periodic registration timer value.

In one embodiment, the condition includes at least one of:
identity information of the terminal;
location or area information of the terminal;
date and/or time information.

In one embodiment, the AMF sets the UE mobility management parameters according to the UE mobility-related information, including:

the AMF determines the UE mobility management parameters according to the condition in which the terminal is (e.g., time, location, and other information) and the UE mobility behavior information; or the AMF determines the UE mobility management parameters when determining that the condition in which the terminal is satisfies the condition of using the UE mobility management parameters contained in the UE mobility management policy information.

In one embodiment, the AMF sets the UE mobility management parameters according to the UE mobility-related information, including:

allocating a registration area for the terminal and notifying the terminal; and/or allocating a periodic registration timer value for the terminal and notifying the terminal.

Figure 7:
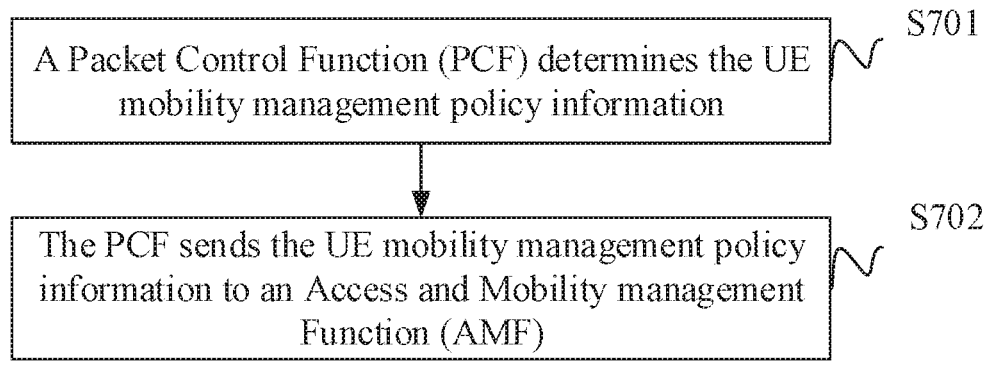
FIG. 7 is a schematic diagram of an overall process of an information processing method at the PCF side provided by an embodiment of the present application.

Correspondingly, at the PCF side, referring to FIG. 7, an information processing method provided by an embodiment of the present application includes:

S701: a PCF determines the UE mobility management policy information;

S702: the PCF sends the UE mobility management policy information to an AMF.

In one embodiment, the PCF determines the UE mobility management policy information, including:

the PCF receives the UE mobility behavior information sent by an NWDAF, and the PCF generates the UE mobility management policy information according to the UE mobility behavior information;

or the PCF receives the UE mobility management policy information sent by the NWDAF, that is to say, the NWDAF may also directly send the UE mobility management policy information to the PCF.

In one embodiment, the UE mobility management policy information includes:

recommended registration area information and the condition thereof; and/or recommended periodic registration timer value and the condition thereof.

Figure 8:
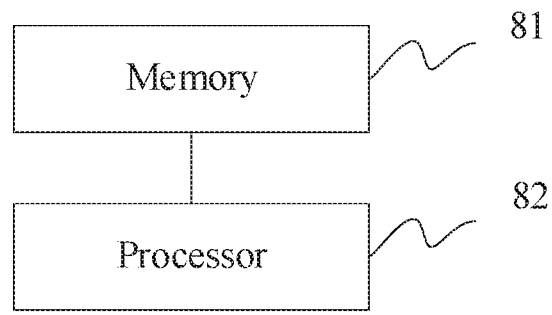
FIG. 8 is a structural schematic diagram of an information processing apparatus at the AMF side provided by an embodiment of the present application.

Referring to FIG. 8, at the AMF side, an information processing apparatus provided by an embodiment of the present application includes:

a memory 81 configured to store program instructions;

a processor 82 configured to invoke the program instructions stored in the memory, and in accordance with the obtained program, perform the process of:

receiving the UE mobility-related information via a transceiver (not shown in the figure), and the UE mobility-related information is the UE mobility behavior information sent by an NWDAF or the UE mobility management policy information sent by a PCF;

setting the UE mobility management parameters according to the UE mobility-related information.

In one embodiment, the UE mobility management policy information includes:

UE mobility management parameters, and the condition of using the UE mobility management parameters.

In one embodiment, the UE mobility management parameters include:

recommended registration area information; and/or
recommended periodic registration timer value.

In one embodiment, the condition includes at least one of:
identity information of the terminal;
location or area information of the terminal;
date and/or time information.

In one embodiment, the processor sets the UE mobility management parameters according to the UE mobility-related information, including:

the processor determines the UE mobility management parameters according to the condition in which the terminal is and the UE mobility behavior information; or the processor determines the UE mobility management parameters when determining that the condition in which the terminal is satisfies the condition of using the UE mobility management parameters contained in the UE mobility management policy information.

In one embodiment, the processor sets the UE mobility management parameters according to the UE mobility-related information, including:

the processor allocates a registration area for the terminal and notifies the terminal via the transceiver; and/or the processor allocates a periodic registration timer value for the terminal and notifies the terminal via the transceiver.

Figure 9:
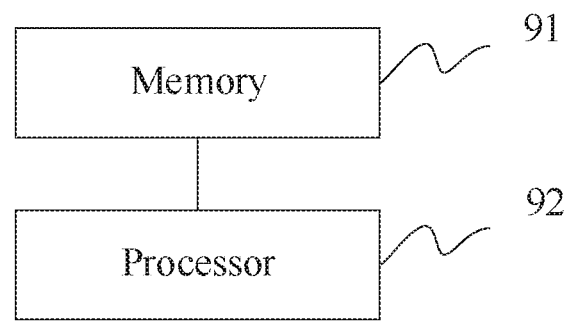
FIG. 9 is a structural schematic diagram of an information processing apparatus at the PCF side provided by an embodiment of the present application.

Referring to FIG. 9, at the PCF side, a second information processing apparatus provided by an embodiment of the present application includes:

a memory 91 configured to store program instructions;

a processor 92 configured to invoke the program instructions stored in the memory, and in accordance with the obtained program, perform the process of:

determining the UE mobility management policy information;

sending the UE mobility management policy information to an AMF via a transceiver.

In one embodiment, the determining the UE mobility management policy information, includes:

receiving the UE mobility behavior information sent by an NWDAF via the transceiver, and generating the UE mobility management policy information according to the UE mobility behavior information;

or receiving the UE mobility management policy information sent by the NWDAF via the transceiver.

In one embodiment, the UE mobility management policy information includes:

recommended registration area information and the condition thereof; and/or recommended periodic registration timer value and the condition thereof.

The processor described in the embodiments of the present application may be Central Processing Unit (CPU), Application Specific Integrated Circuit (ASIC), Field-Programmable Gate Array (FPGA) or Complex Programmable Logic Device (CPLD).

Figure 10:
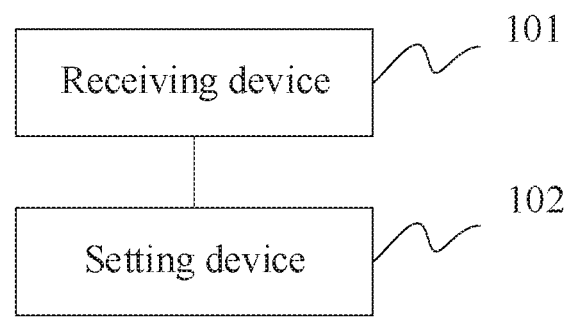
FIG. 10 is a structural schematic diagram of another information processing apparatus at the AMF side provided by an embodiment of the present application.

Referring to FIG. 10, at the AMF side, a third information processing apparatus provided by an embodiment of the present application includes:

a receiving device 101 configured to receive the UE mobility-related information, and the UE mobility-related information is the UE mobility behavior information sent by an NWDAF or the UE mobility management policy information sent by a PCF;

a setting device 102 configured to set the UE mobility management parameters according to the UE mobility-related information.

Figure 11:
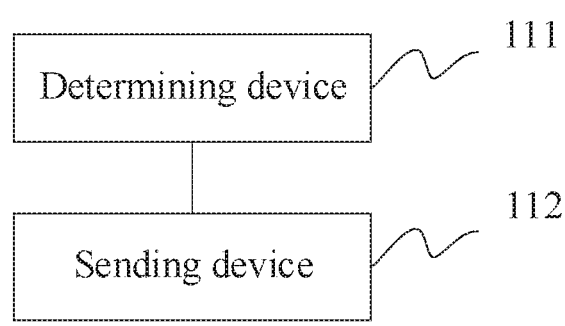
FIG. 11 is a structural schematic diagram of another information processing apparatus at the PCF side provided by an embodiment of the present application.

Referring to FIG. 11, at the PCF side, a fourth information processing apparatus provided by an embodiment of the present application includes:

a determining device 111 configured to determine the UE mobility management policy information;

a sending device 112 configured to send the UE mobility management policy information to an AMF.

It should be noted that any of the apparatuses described in the embodiments of the present application may be any apparatus at the network side, or may be an AMF/PCF and other devices, which is not limited.

The apparatus described in the embodiments of the present application may further include input/output devices and the like, where the input devices may include a keyboard, a mouse, a touch screen and the like, and the output devices may include a display device, such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the above computing device, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

In summary, in the embodiments of the present application, the UE mobility management parameters and the condition thereof are determined according to the mobility analysis result or the mobility (management) policy of the terminal; and when the terminal meets the condition of using the parameters, the mobility management parameters are used to provide services for the terminal. The mobility analysis result of the terminal is provided by the NWDAF, and the mobility (management) policy is provided by the PCF; the mobility (management) policy is generated by the PCF according to the mobility analysis result of the terminal provided by the NWDAF, and the content includes the UE mobility management parameters and the condition thereof; the UE mobility management parameters and the condition thereof include: the recommended registration area and the condition thereof; and the recommended periodic registration timer value and the condition thereof. The condition includes specific area and/or specific time period, etc. Here, when the terminal meets the condition of using the parameters, the UE mobility management parameters are used to provide services for the terminal, including: when the terminal enters a specific area or is in a specific time period or enters a specific area in a specific time period, the parameters are used to update the context of the UE and the parameters are provided to the terminal. The recommended registration area is saved as the registration area of the UE and allocated to the UE. The recommended registration timer value is allocated to the UE, and the timer is started according to this value in the subsequent related process. In short, the embodiments of the present application enable the 5G network to customize the mobility management mechanism according to the mobility information of the UE, improving the efficiency of mobility management.

The embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An information processing method comprising:
    receiving, by an Access and Mobility management Function entity, AMF, UE mobility-related information, wherein the UE mobility-related information is UE mobility analytics/prediction information sent by a Network Data Analytic Function entity, NWDAF, or UE mobility management policy information sent by a Packet Control Function entity, PCF;
    setting, by the AMF, UE mobility management parameters according to the UE mobility-related information;
    wherein the setting, by the AMF, UE mobility management parameters according to the UE mobility-related information, comprises:
    determining, by the AMF, the UE mobility management parameters according to a condition in which the terminal is and the UE mobility analytics/prediction information;
    wherein the UE mobility management policy information, comprises:
    UE mobility management policy information generated by the PCF according to the UE mobility analytics/prediction information after the PCF receiving the UE mobility analytics/prediction information.

2. The method according to claim 1, wherein the UE mobility management policy information comprises:
    UE mobility management parameters, and a condition of using the UE mobility management parameters.

3. The method according to claim 2, wherein the UE mobility management parameters comprise:
    registration area information; and/or
    a periodic registration timer value.

4. The method according to claim 2, wherein the condition comprises at least one of:
    identity information of the terminal;
    location or area information of the terminal;
    date or time information.

5. The method according to claim 1, wherein the setting, by the AMF, UE mobility management parameters according to the UE mobility-related information, comprises:
    allocating a registration area for the terminal and notifying the terminal of the registration area; and/or
    allocating a periodic registration timer value for the terminal and notifying the terminal of the periodic registration timer value.

6. An information processing method comprising:
    determining, by a PCF, UE mobility management policy information;
    sending, by the PCF, the UE mobility management policy information to an AMF;
    wherein the UE mobility management policy information is used to determine UE mobility management parameters for the AMF;
    wherein the determining, by a PCF, UE mobility management policy information, comprises:
    receiving, by the PCF, UE mobility analytics/prediction information sent by an NWDAF, and generating, by the PCF, the UE mobility management policy information according to the UE mobility analytics/prediction information.

7. The method according to claim 6, wherein the mobility management policy information comprises:
    registration area information and a condition of using the registration area information; and/or
    a periodic registration timer value and a condition of using the periodic registration timer value.

8. An information processing apparatus comprising:
    a memory configured to store program instructions;
    a processor configured to invoke the program instructions to perform following processes of:
    receiving UE mobility-related information via a transceiver, wherein the UE mobility-related information is UE mobility analytics/prediction information sent by an NWDAF or UE mobility management policy information sent by a PCF;
    setting UE mobility management parameters according to the UE mobility-related information;
    wherein the processor sets the UE mobility management parameters according to the UE mobility-related information, by:
    determining the UE mobility management parameters according to a condition in which the terminal is and the UE mobility analytics/prediction information;
    wherein the UE mobility management policy information, comprises:
    UE mobility management policy information generated by the PCF according to the UE mobility analytics/prediction information after the PCF receiving the UE mobility analytics/prediction information.

9. The apparatus according to claim 8, wherein the UE mobility management policy information comprises:
    UE mobility management parameters, and a condition of using the UE mobility management parameters.

10. The apparatus according to claim 9, wherein the UE mobility management parameters comprise:

registration area information; and/or a periodic registration timer value.

11. The apparatus according to claim 9, wherein the condition comprises at least one of:

identity information of the terminal;

location or area information of the terminal;

date or time information.

12. The apparatus according to claim 8, wherein the processor sets the UE mobility management parameters according to the UE mobility-related information, by:

allocating a registration area for the terminal and notifying the terminal of the registration area via the transceiver; and/or allocating a periodic registration timer value for the terminal and notifying the terminal of the periodic registration timer value via the transceiver.

13. An information processing apparatus comprising:

a memory configured to store program instructions;

a processor configured to invoke the program instructions to perform the method of claim 6.

14. The apparatus according to claim 13, wherein the determining UE mobility management policy information, comprises:

receiving UE mobility analytics/prediction information sent by an NWDAF via the transceiver, and generating the UE mobility management policy information according to the UE mobility analytics/prediction information;

or receiving the UE mobility management policy information sent by the NWDAF via the transceiver.

15. The apparatus according to claim 13, wherein the UE mobility management policy information comprises:

registration area information and a condition of using the registration area information; and/or a periodic registration timer value and a condition of using the periodic registration timer value.

16. A non-transitory computer storage medium storing computer executable instructions which are configured to cause a computer to perform the method of claim 1.

17. A non-transitory computer storage medium storing computer executable instructions which are configured to cause a computer to perform the method of claim 6.

* * * * *